March 17, 1953  C. E. DRAYER  2,631,617
TOOL FOR FORMING LOOPS IN WIRE LEADERS
Filed Dec. 10, 1949
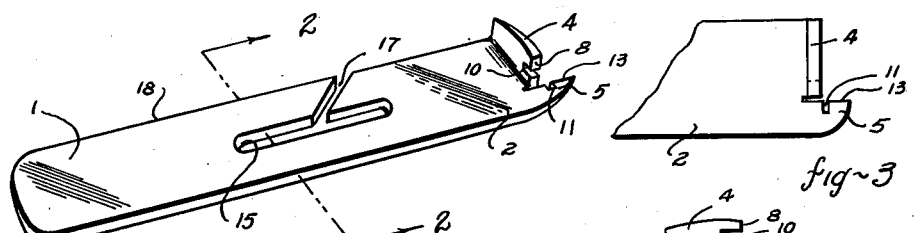
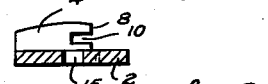
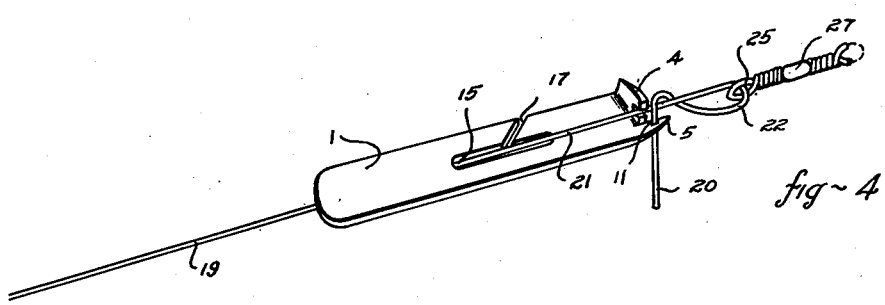
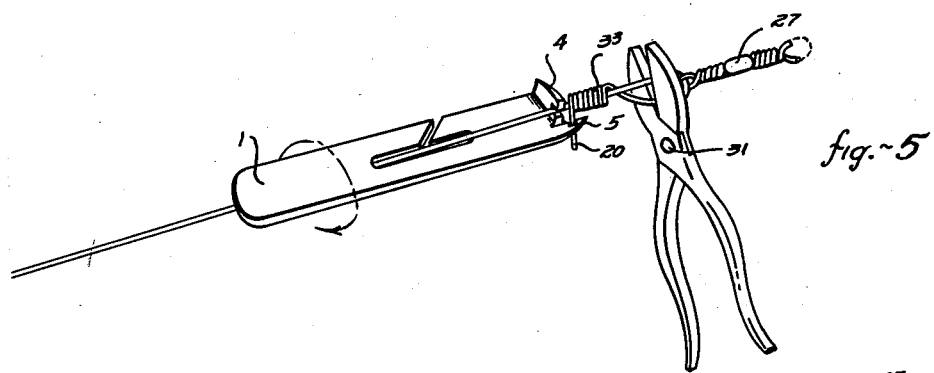
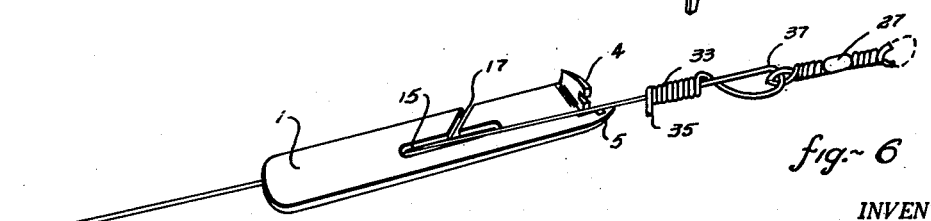
INVENTOR.
CLEON E. DRAYER
BY
Gordon C. Mack
ATTORNEY Patented Mar. 17, 1953

2,631,617

UNITED STATES PATENT OFFICE 2,631,617

TOOL FOR FORMING LOOPS IN WIRE LEADERS

Cleon E. Drayer, Fort Lauderdale, Fla., assignor, by mesne assignments, to Akron Plating Company, Akron, Ohio, a corporation of Ohio Application December 10, 1949, Serial No. 132,245

4 Claims. (Cl. 140—124)

This invention relates to a tool for twisting an end of a wire back on itself to form a loop. It is particularly designed for forming a loop into the end of a fishing tackle leader to connect it with a piece of tackle.

These leaders are stiff, especially those used for ocean fishing and the like which must have high tensile strength. It is usual to use steel wire which is stiff and resilient. To connect a straight wire leader to a piece of tackle the end of the wire is doubled back along itself forming a hairpin-shaped bend. This is looped through the tackle. The free end of the loop is then twisted around the straight length of the leader. The tool of this invention is adapted to engage the straight portion of the leader and the free end, so that by rotating the tool while holding the tackle, the free end of the leader is wrapped tightly around the straight portion.

The tool is formed with a substantially flat body portion having two flat lugs projecting outwardly at one end. These lugs are disposed edge to edge; one being perpendicular to the body and the other projecting straight outwardly from the end of the same plane as the body. To form a loop, the straight portion and free end of the leader are caught in notches in the inner edges of the respective lugs. The tool is preferably of a size to fit comfortably in a man's hand. By holding it firmly while twisting the piece of tackle, the free end is wound around the straight length of the leader.

The invention will be further described by reference to the drawings in which—

Fig. 1 is a perspective view of the preferred tool;

Fig. 2 is a cross-sectional view on the line 2—2 of Fig. 1;

Fig. 3 is a plan view of the end of the tool at which the lugs are located; and

Figs. 4–6 are perspective views each showing a different step in the operation of the tool.

The preferred tool 1 is formed with a substantially flat, narrow body portion 2. At one end of this body there are two outwardly projecting flat lugs 4 and 5 disposed edge to edge. Lug 4 is substantially perpendicular to the body and lug 5 beside it projects outwardly from the end of the body in the same plane as the body. The inner edge 8 of lug 4 is provided with a recess of notch 10 and there is a similar notch 11 in the inner edge 13 of lug 5.

The body is provided with a long slot 15 which extends longitudinally through its center portion and which is substantially aligned with notch 10 in lug 4. A narrow opening 17 leads from the edge 18 of the body into the slot. When the tool is being used the straight portion of the wire leader extends through this slot from one face of the body to the other. After the loop is completely fastened the tool is disengaged from the leader by moving a straight portion of the leader through this narrow passage 17.

The tool may be conveniently stamped to the proper shape in a single operation. It is preferably formed from a flat metal bar, the lugs being formed by splitting the end of the bar and then bending one of the split portions upwardly to form lug 4. It is not necessary that these lugs be exactly perpendicular to each other, but only substantially so.

Figs. 4 to 6 illustrate the manner in which the tool is operated. Before the tool is engaged with the leader 19 the free end 20 of the leader is doubled back along the straight portion 21 forming a hairpin-shaped bend 22. This end 20 is then inserted through the ring 25 of the adjoining piece of tackle 27 which may be used for retaining bait, hooks, lures or the like. End 20 is so long that after being looped through the ring it can be bent around the straight portion 21 of the leader and caught in the notch 11, as shown in Fig. 4.

To engage the tool with the leader the straight portion 21 of the leader is positioned in the slot 15 in the body of the tool by moving the wire through the narrow opening 17 (or by passing the free end 20 through the slot before looping it through ring 25). The straight portion of the leader near the loop is then fitted into notch 10 in lug 4 and the free end 20 is fitted into notch 11 in lug 5. The looped end of the leader is held by pliers 31 or any suitable implement and then the tool is rotated around the straight portion of the wire in the direction of the arrow in Fig. 5. This bends end 20 of the leader around the straight portion 21 to form the tight spiral coil 33. The slot 15 through which the leader extends holds it in a substantially fixed position longitudinally of the tool, as the tool is rotated.

After end 20 has been coiled around the straight portion of the leader, the tool is rotated in the reverse direction to disengage the notch 11 from the free end 20, the straight portion of the leader is removed from notch 10, and the tool is disengaged from the leader by moving the leader through the narrow opening 17. A slight tip or nub 35 (Fig. 6) remains at the end of the coil since all of end 20 of the leader cannot be twisted against the straight portion 21 by the lug 5. This tip will be very sort—usually about $\frac{1}{16}$ of an inch long, and it may be cut off close to the coil or it may be crimped down with the pliers if desired.

To change tackle, the loop is snipped at 37 with wire cutters, and the coil 33 is slipped from the straight end of the leader, disengaged from the tackle, and discarded. A fresh hairpin bend is made in the straight end of the wire and a new piece of tackle is engaged, and it is secured in the manner already described.

This tool is inexpensive and particularly convenient for a fisherman to use when out in a boat, etc. The wire used for these leaders is usually so stiff and springy that it can be bent only with difficulty. It would be impossible to form such a tight coil by hand. The preferred tool will be of a size to fit across the palm of a man's hand, and can be conveniently carried in a pocket or tackle box.

The invention is not limited to the preferred form here illustrated. Modifications of this structure may be made within the scope of the appended claims.

What I claim is:

1. A tool for forming wire loops, having an elongated body portion, an elongated slot lengthwise of the body portion, two lugs at one end of the body portion—one lying in the plane of the body portion and the other being across one end of the tool and substantially perpendicular thereto, the inner edges of the lugs being adjacent one another, a notch in each of these edges, that notch in the edge of the perpendicular lug being substantially in line with the slot, and an opening from the edge of the tool into the slot.

2. A metal tool for forming wire loops, having an elongated flat body portion of a size adapted to fit in a man's hand, an elongated slot lengthwise of the body portion and lying substantially along the center line thereof, a narrow lug extending from one side of one end of the body portion and in the plane thereof, another lug formed across the balance of said end and perpendicular to the body portion, the inner edge of each of the lugs lying in substantially the same perpendicular plane and a notch in each, the notch in the perpendicular lug being substantially in line with the slot, and a narrow opening from the edge of the tool nearest the perpendicular lug to about the middle of one edge of the slot and slanting from the slot toward said end of the tool.

3. A tool for forming wire loops comprising an elongated substantially flat body portion having two flat lugs projecting from one end thereof, the lugs being disposed edge to edge and one of the lugs being across one end of the tool and substantially perpendicular to the body portion, a notch in each lug in the edge thereof facing the other lug which notches are each adapted to receive a different portion of the wire, and means in the body portion for retaining the wire in the notch perpendicular to the body portion, to hold it longitudinally of the body portion while the tool is being used.

4. A tool for forming wire loops which comprises a metal body portion having two lugs projecting from one end thereof, the lugs being disposed edge to edge and one of the lugs being bent substantially perpendicular to the body of the tool and across one end thereof, the other lug extending beyond said first lug and lying substantially in the plane of the tool, there being a notch in the inner edge of each lug and means in the body portion for aligning wire with the notch in said bent lug.

CLEON E. DRAYER.

REFERENCES CITED

The following references are of record in the file of this patent:

UNITED STATES PATENTS

| Number | Name | Date |
| --- | --- | --- |
| 269,498 | Gurney | Dec. 19, 1882 |
| 317,543 | Jones | May 12, 1885 |
| 339,607 | Wilcox | Apr. 6, 1886 |
| 557,861 | Kirby | Mar. 2, 1897 |
| 789,941 | Sibley | May 16, 1905 |
| 939,509 | Huston | Nov. 9, 1909 |
| 1,007,535 | Cones | Oct. 31, 1911 |
| 1,530,455 | Wright | Mar. 17, 1925 |
| 2,165,883 | Carter | July 11, 1939 |
| 2,424,370 | Schwyn | July 22, 1947 |